United States Patent [19]

Watanabe

[11] Patent Number: 5,109,335
[45] Date of Patent: Apr. 28, 1992

[54] BUFFER MEMORY CONTROL APPARATUS USING ADDRESS TRANSLATION

[75] Inventor: Tsuyoshi Watanabe, Hadano, Japan

[73] Assignee: Hitachi, Ltd., Tokyo, Japan

[21] Appl. No.: 250,942

[22] Filed: Sep. 29, 1988

[30] Foreign Application Priority Data

Oct. 2, 1987 [JP] Japan .................. 62-247802

[51] Int. Cl.⁵ .................. G06F 12/10; G06F 13/00
[52] U.S. Cl. .................. 395/400; 364/239; 364/256.3; 364/DIG. 1
[58] Field of Search ... 364/200 MS File, 900 MS File

[56] References Cited

U.S. PATENT DOCUMENTS

| | | | |
|---|---|---|---|
| 4,056,844 | 11/1977 | Izumi | 364/200 |
| 4,332,010 | 5/1982 | Messina et al. | 364/200 |
| 4,618,926 | 10/1986 | Kubo et al. | 364/200 |
| 4,683,533 | 7/1987 | Shiozaki et al. | 364/200 |
| 4,943,914 | 7/1990 | Kubo | 364/200 |

FOREIGN PATENT DOCUMENTS 0224268 9/1972 European Pat. Off. .
0212678 5/1988 European Pat. Off. .

OTHER PUBLICATIONS

European Search Report from European Patent Application No. EP 88 11 6184.
IBM Technical Disclosure Bulletin, vol. 22, No. 8A, Jan. 1980, pp. 3331-3333; J. M. Lee et al., "A Solution to the Synonym Problem".
IBM Technical Disclosure Bulletin, vol. 26, No. 12, May 1984, pp. 6264-6265; H. R. Brandt et al., "High Speed Buffer with Dual Directories".

Primary Examiner—Eddie P. Chan
Attorney, Agent, or Firm—Fay, Sharpe, Beall, Fagan, Minnich & McKee

[57] ABSTRACT

For address identification of a cache memory, a part of address bits of a logical address which are subject to address translation through a TLB and a part of address bits of the logical address which are not subject to address translation are applied in combination to an address array of the cache memory. Synonym generation is detected in response to buffer miss and synonym invalidation is executed in the buffer address array.

6 Claims, 6 Drawing Sheets

PARALLEL ACCESS

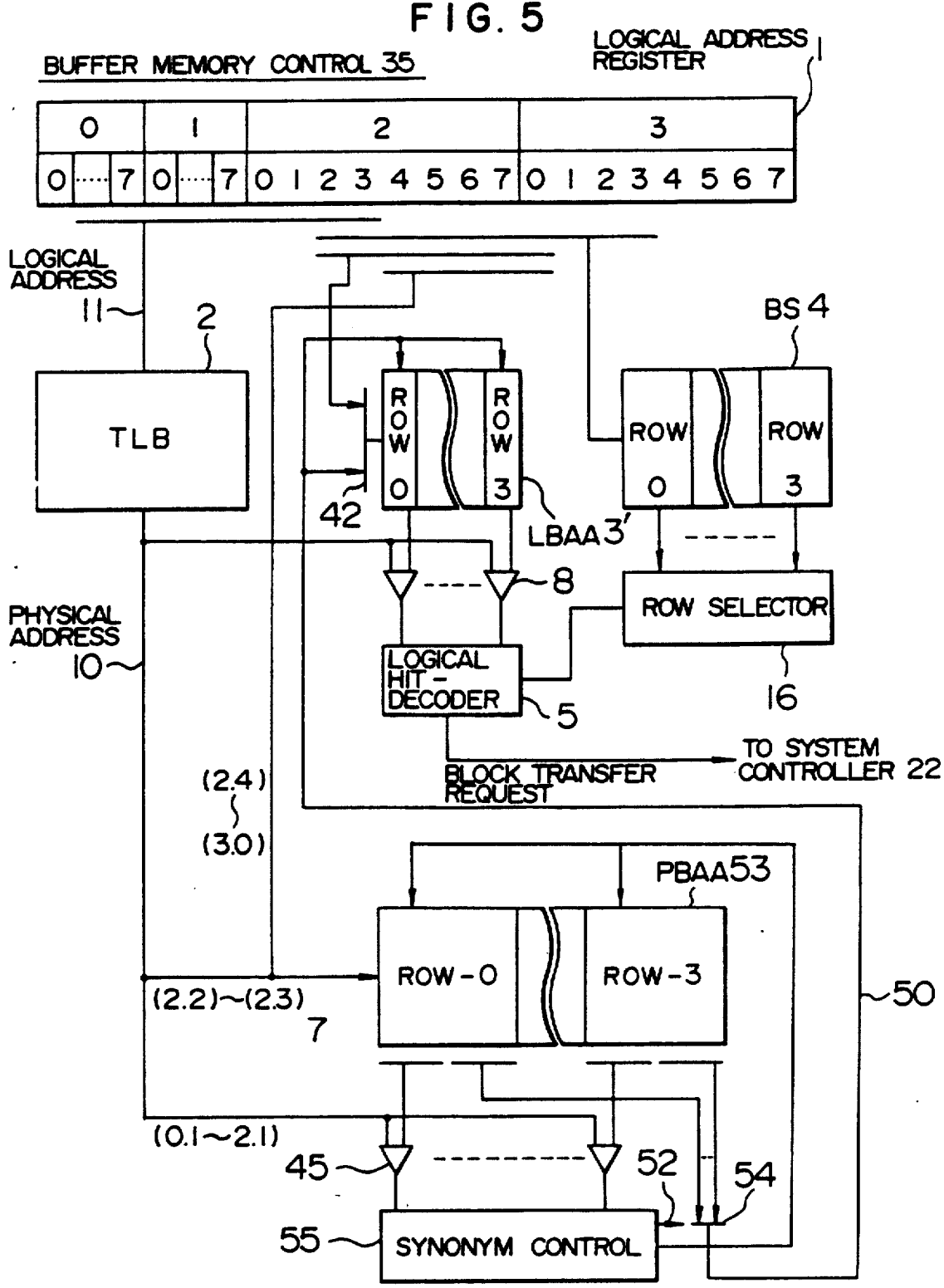

BUFFER MEMORY CONTROL APPARATUS USING ADDRESS TRANSLATION

CROSS-REFERENCES TO RELATED APPLICATIONS

The present invention relates to U.S. Patent application Ser. No. 110,425 entitled "STORAGE CONTROL SYSTEM AND LOGIC-IN MEMORY DEVICE THEREFOR" filed by K. KUBO on Oct. 20, 1987, now U.S. Pat. No. 4,943,914.

BACKGROUND OF THE INVENTION

The present invention relates to an information processing apparatus and particularly to a buffer memory control apparatus which is optimum to access a buffer memory efficiently.

U.S. Pat. No. 4,332,010 discloses a mechanism for detecting and handling a cache synonym.

One of the problems in making access to a buffer memory is a problem of synonyms. The term "synonyms" means a plurality of blocks of logical address pages corresponding to one and the same physical address. This is because a logical address is used as an address to make access to a buffer memory, and one and the same real address is assigned to a plurality of different logical addresses through paging a main storage.

In order to make access to a buffer memory, three functional portions are required as follows. A first one is a translation lookaside buffer (hereinafter abbreviated to "TLB") for translating the logical address to be used for the access into a physical address, a second one is a buffer address array (hereinafter abbreviated to "BAA") for storing address tags of blocks within a buffer storage, and a third one is the buffer storage (hereinafter abbreviated to "BS") for storing data by blocks.

In order to make access to the thus arranged buffer memory at a high speed, there is a parallel access system in which the above three functional portions are actuated in parallel to each other with a given logical address.

FIG. 1 is a block diagram showing an intermediate stage prepared to explain the parallel access system according to the present invention.

The logical address of a logical address register 1 is divided into two groups of bit positions, one of which groups consists of the bit positions (0, 1), (0, 2), ... (2, 2), and (2, 3) which are to be subject to address translation, while the other group consists of the bit positions (2, 4), (2, 5), ... (3, 6), and (3, 7) which are not subject to address translation. A TLB 2 is composed of pairs of logical addresses and physical addresses, so that upon reception of the address bits (0, 1) through (2, 3) to be subject to address translation from the logical address register 1 on a line 11, the TLB 2 puts out a physical address corresponding to the input logical address.

A BAA 3 is a memory storing physical addresses of blocks of a BS 4 and constituted by four rows (row 0–row 3), each row being constituted by four groups numbered with an address of two bits (2, 2) and (2, 3). According to this expression, it is possible to divide an address (32 bits) into four bytes (each 8 bits) from its MSB so as to specify the position of each bit by a format of (byte, bit).

A comparator circuit 8 constituted by a plurality of comparators compares a physical address read out on lines 19 from the BAA 3 in response to the address input to the BAA 3 with a physical address obtained on a line 10 through address translation in the TLB 2, and upon detection of coincidence between both the physical addresses, the comparator circuit 8 makes a hit signal 18 be logic "1". Upon reception of this hit signal, a logical hit/decode circuit 5 checks the logical state of the output signal of the comparator circuit 8 and produces a row selection signal 15 which is in turn applied to a row selecting circuit 6.

If the hit signal by the group numbered with the address bits (2, 2) and (2, 3) (called a logical group) of the four groups is not made to be logic "1" but of the hit signal by any other group (called a synonym group) is made logic "1", the logical hit/decode circuit 5 makes a synonym hit signal 9 be logic "1". Upon reception of the synonym hit signal 9, a synonym control circuit 7 makes a synonym invalidation signal 17 be logic "1" so as to invalidate the valide bits of the synonym group by use of the row and group numbers.

The BS 4 is constituted by four rows, and arranged to be accessed through a line 12 with the address bits "(2, 2), ... (3, 3)" to be subject to address translation through a line 12. In response to the row selection signal 15, the row selection circuit 6 selects one of the buffer row data 14 read out from the BS 4 and puts out a buffer data 16.

For example, U.S. Pat. No. 4,332,010 concerns such an apparatus of the kind as described above.

In the apparatus described above, however, there is a problem of in access speed due to a physical problem in the designing of a memory chip of the BAA 3. That is, the quantity of association of the BAA is a product of the number of sets or rows and the number of groups, for example, $4 \times 4 = 16$ in this example of FIG. 1. The data width required to a memory chip increases in proportion to the quantity of association and the memory cell reading current increases in proportion to the data width. The quantity of heat generation of the memory cell is therefore increased because it is given by a product of the current and voltage required for memory cell reading. In order to accommodate the quantity of heat generation of the memory cell within a certain range, there is a problem that it cannot but to minimize the reading current even if the access speed is reduced.

SUMMARY OF THE INVENTION

It is therefore an object of the present invention to provide a buffer memory control apparatus in which the access speed is made high while the physical problem in memory chip in the prior art is solved.

It is another object of the present invention to provide a buffer memory control apparatus in which the quantity of association of the buffer address array (BAA) corresponding to the address tag of the buffer memory can be reduced and the access speed can be made high.

It is still another object of the present invention to provide a buffer address array (BAA) which is arranged to be accessed with a real address.

It is a further object of the present invention to provide a buffer memory control apparatus in which the quantity of association of the buffer address array (BAA) can be reduced to $\frac{1}{4}^N$ where N represents the number of bits to be subject to address translation of those address bits to be used for the identification or access of the BAA.

The above objects can be attained by controlling a buffer address array (BAA) arranged to be accessed with a logical address and another buffer address array (BAA) arranged to be accessed with a physical address in combination. That is, the buffer control apparatus includes a first buffer address array (BAA) and a second buffer address array (BAA), the first buffer address array (BAA) being accessed with a part of bits of a logical address which are to be subject to address translation and a part of bits of a logical address which are not to be subject to address translation, the second buffer address array (BAA) being accessed or identified by use of a physical address and being capable of detecting a synonym.

The function of the BAA is divided into a row selecting function, and a synonym group selecting function and the row selecting function and the synonym group selecting function are designed on corresponding memory chips respectively. That is, the function of the BAA is constituted by a combination of two kinds of buffer address arrays (BAAs) which will be described hereunder. The first buffer address array (BAA) is constituted by columns having a quantity of association corresponding to the number of rows and being accessed with an address including bit portions of a logical address which are subject to address translation, while the second buffer address array (BAA) is constituted by columns having a quantity of association corresponding to a product of the number of rows and the number of groups and being accessed with an address including no bit portions of the logical address which are subject to address translation.

The first buffer address array (BAA) is accessed every time the buffer memory is accessed so that the existence of a target block to be accessed in its logical group and a row of the buffer memory is selected. The second buffer address array (BAA) is accessed to judge whether or not the target block exists in its synonym group when the target block does not in the logical groups. When the target block exists in the synonym group, the synonym groups are invalidated in the first and second buffer address arrays (BAAs).

BRIEF DESCRIPTION OF THE DRAWINGS

FIG. 5 is a block diagram illustrating a second embodiment of the buffer memory control apparatus according to the present invention;

FIG. 6 is a diagram illustrating a format in an LBAA 3' for synonym invalidation in the second embodiment of the present invention.

DESCRIPTION OF THE PREFERRED EMBODIMENTS

Figure 2:
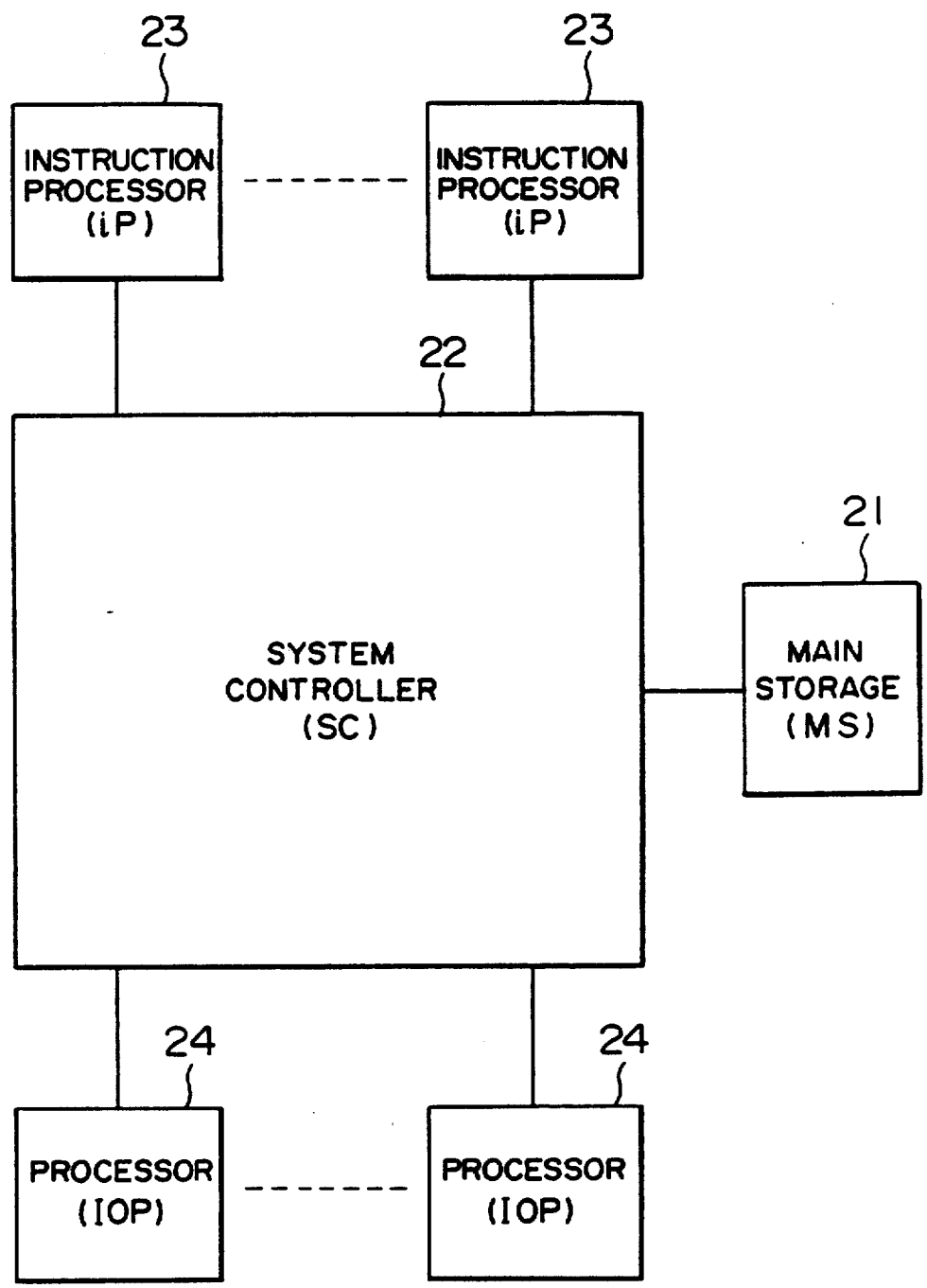
FIG. 2 is a block diagram illustrating a structure of a computer system.

FIG. 2 shows the structure of a general computer system which is constituted by a main storage (hereinafter abbreviated to "MS") 21, a system controller (hereinafter abbreviated to "SC") 22, instruction processors (hereinafter abbreviated to "iPs") 23, and input/output processors (hereinafter abbreviated to "IOPs") 24. The IOPs 24 is arranged to control the data transfer between the MS 21 and I/O devices.

Figure 3:
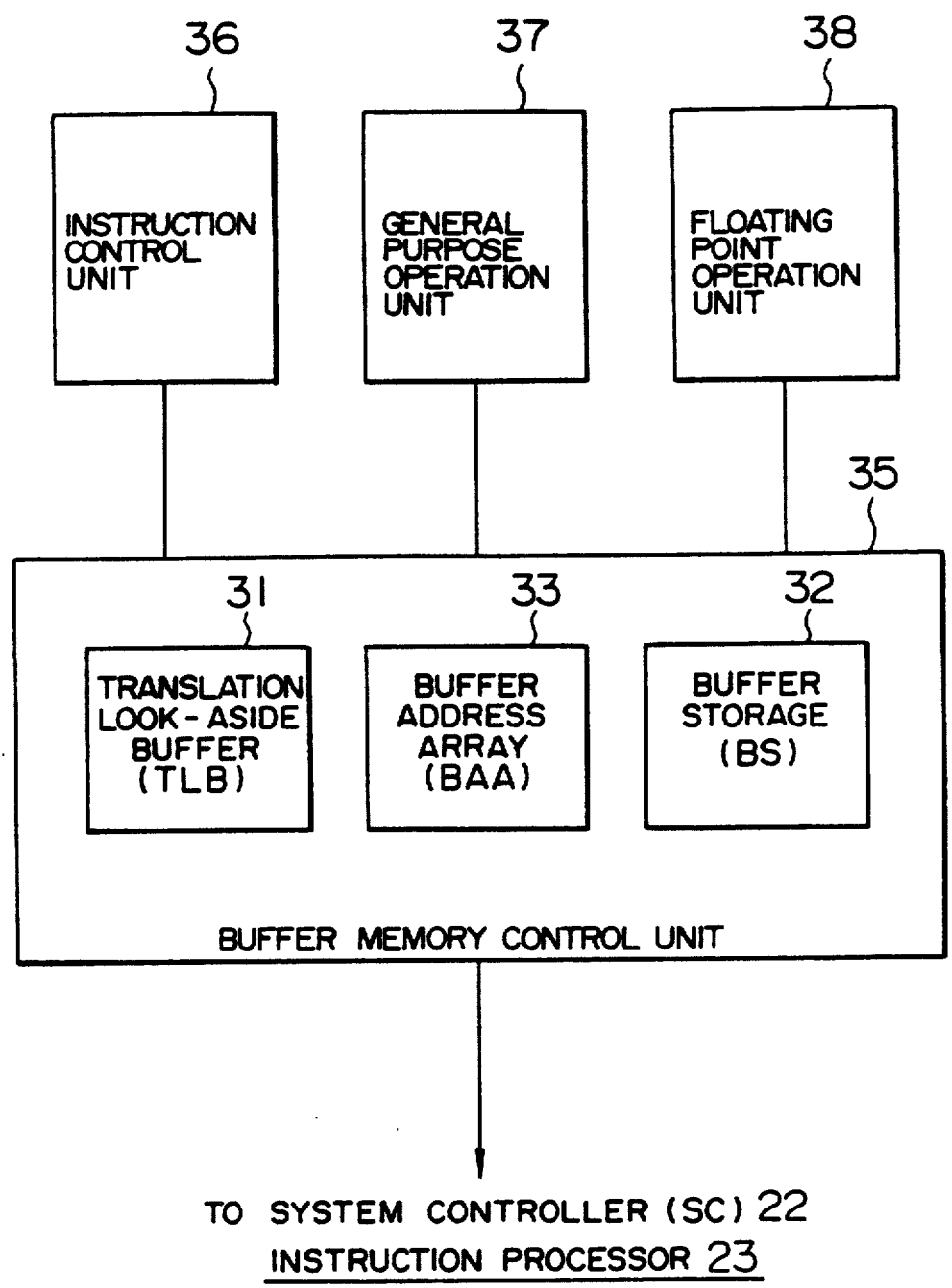
FIG. 3 is a block diagram illustrating a structure of an instruction processor.

FIG. 3 shows the structure of the iP 23. In this structure, a buffer memory control unit 35 is connected to the SC 22 and supplies instructions and data to an instruction control unit 36, a general purpose operation unit 37, and a floating point operation unit 38. The buffer memory control unit 35 has a translation lookaside buffer (TLB) 31 for storing pairs of logical addresses and physical addresses, a buffer storage (BS) 32 for temporarily storing data read out from the MS 21, and a buffer address array (BAA) 33 having an array of addresses of the respective blocks of the BS 32 which are necessary to identify the BS 32.

The instruction control unit 36 reads out instructions from the BS 32, decodes the instructions and supplied the decoded instructions to the operation units 37 and 38.

The general purpose operation unit 37 executes fixed point operation, logical operation, decimal operation, system control, and so on, and the floating point operation unit 38 executes floating point operation.

Figure 4:
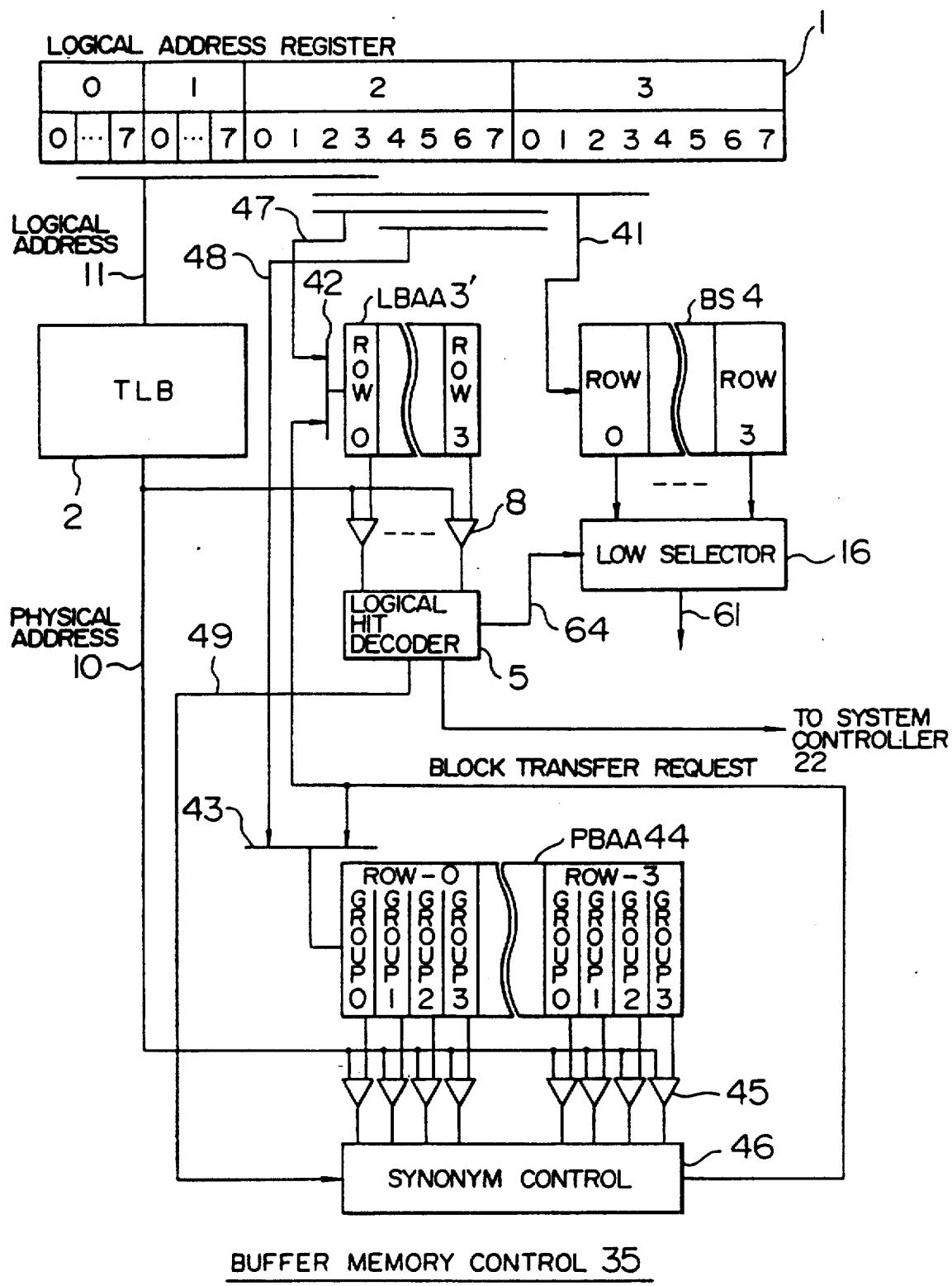
FIG. 4 is a block diagram illustrating a first embodiment of the buffer memory control apparatus according to the present invention.

FIG. 4 shows the internal structure of the buffer memory control unit 35, as an embodiment of the present invention.

Figure 1:
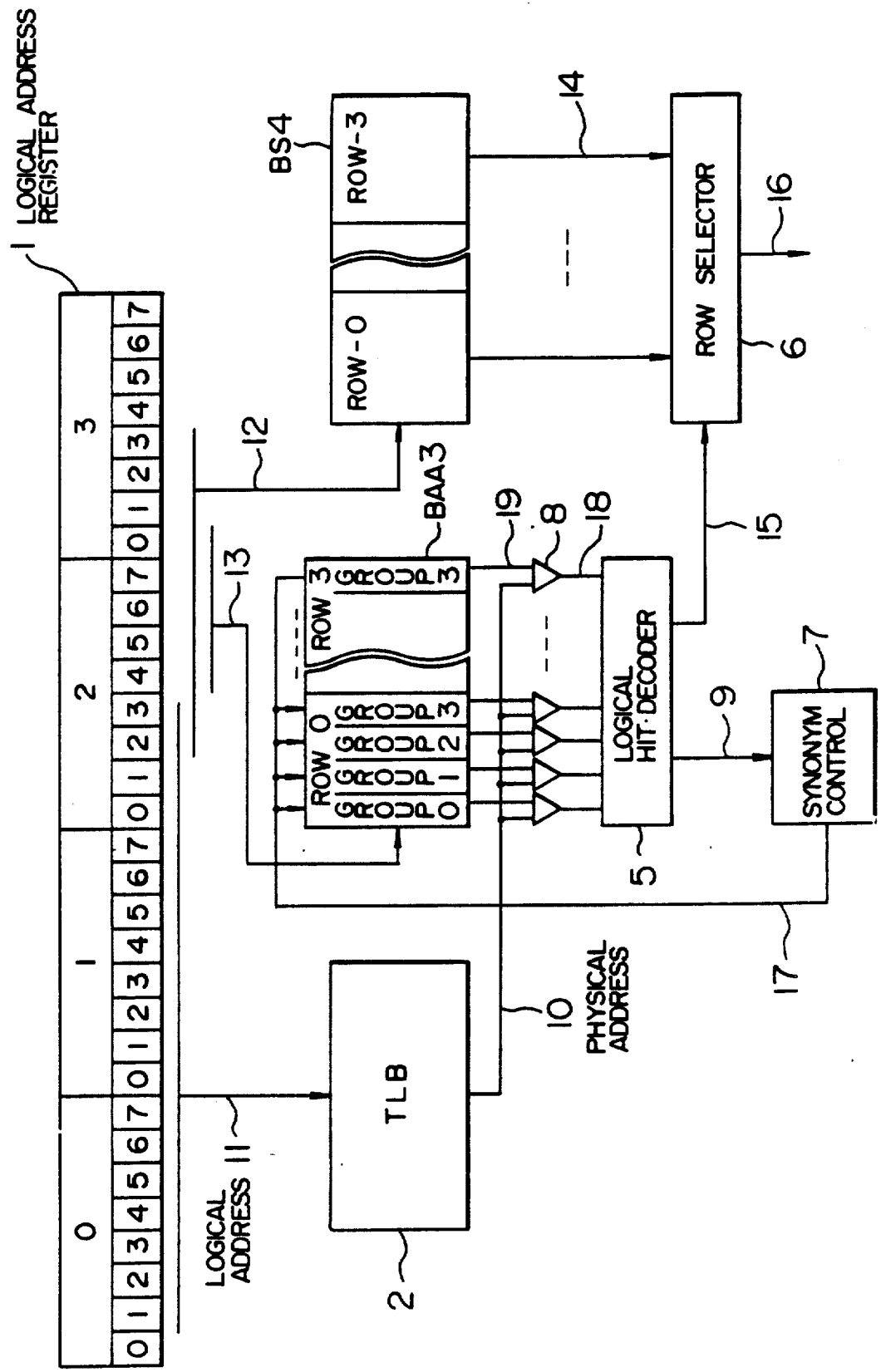
FIG. 1 is a block diagram showing parallel access to the TLB, BAA and BS in a circuit arrangement obtained in the process of completion of the present invention.

In FIG. 4, a logical address register 1 is arranged to latch a fetch request address sent out from the instruction control unit 36, the general purpose operation unit 37, and the floating point operation unit 38. The BAA 3 of FIG. 1 is divided into a logical buffer address array LBAA 3' and a synonym buffer address array PBAA 44. The LBAA 3' is arranged to be accessed with an address of bits (2, 2) through (3, 0) of a logical address including two bits (2, 2) and (2, 3) which are to be subject to address translation. A comparator circuit 8 constituted by a plurality of comparators compares a physical address put out from the LBAA 3' with a physical address 10 translated in the TLB 2 to detect coincidence between the two physical addresses. A logical hit decode circuit 5 checks the output of the comparator circuit 8 and outputs an output signal 64. Upon reception of the output signal 64 from the logical hit decode circuit 5, a row selecting circuit 16 selects row data (address) from the BS 4 so as to puts out a selected row data 61 when the data exists in the BS 4.

The PBAA 44 is constituted by columns having a quantity of association corresponding to a product of the number of rows and the number of groups and being accessed with an address of five bits (2, 4) through (2, 7) and (3, 0) of the logic address which are not subject to address translation. In the PBAA 44, the synonym groups are arranged in the direction of association and all the prospective ones of synonyms, that is, all the entries which may be synonyms, can be read out parallelly. A comparator circuit 45 constituted by a plurality of comparators compares the physical address 10 from the TLB 2 with the output from the PBAA 44. On the basis of the result of comparison by the comparator circuit 45, a synonym control circuit 46 puts out a hit row number and a hit synonym number.

Thus, the LBAA 3' is arranged to be accessed with an address of the logical address register 1 and a proper rows of the BS 4 is selected through the comparator circuit 8 and the logical hit decode circuit 5, so that the reading of the BS 4 is performed.

FIG. 5 shows a second embodiment of the present invention which is different from the embodiment of FIG. 4 mainly in the structure of the physical buffer address array.

A PBAA 53 is arranged to be accessed with a physical address 10 which has been obtained through the logical address to physical address translation by a TLB 2. In the entry of each row of the PBAA 53, the row number and group number corresponding to those of the LBAA 3' are held.

When all the outputs of the comparator circuit 8 are zero, that is, in the case of buffer miss, as a result of making access to the LBAA 3', further access is made to the PBAA 53. In this case, "hit" means existence of synonyms. The hit row of the row number and group number corresponding to the LBAA read out from the PBAA 53 is selected through a selector 54 and the corresponding synonym of the LBAA 3' is invalidated. That is, a validity bit V shown in a format shown is FIG. 6 is reset to zero. The structure constituted by the PBAA 44, the synonym control circuit 46 and the comparator circuit 45 in FIG. 4, and the structure constituted by the PBAA 53, the synonym control circuit 55 and the comparator circuit 45 in FIG. 5 may be realized as a function executed in a write buffer address array (BAA) having a function capable of detecting synonyms which occur in writing operation.

Figure 7:
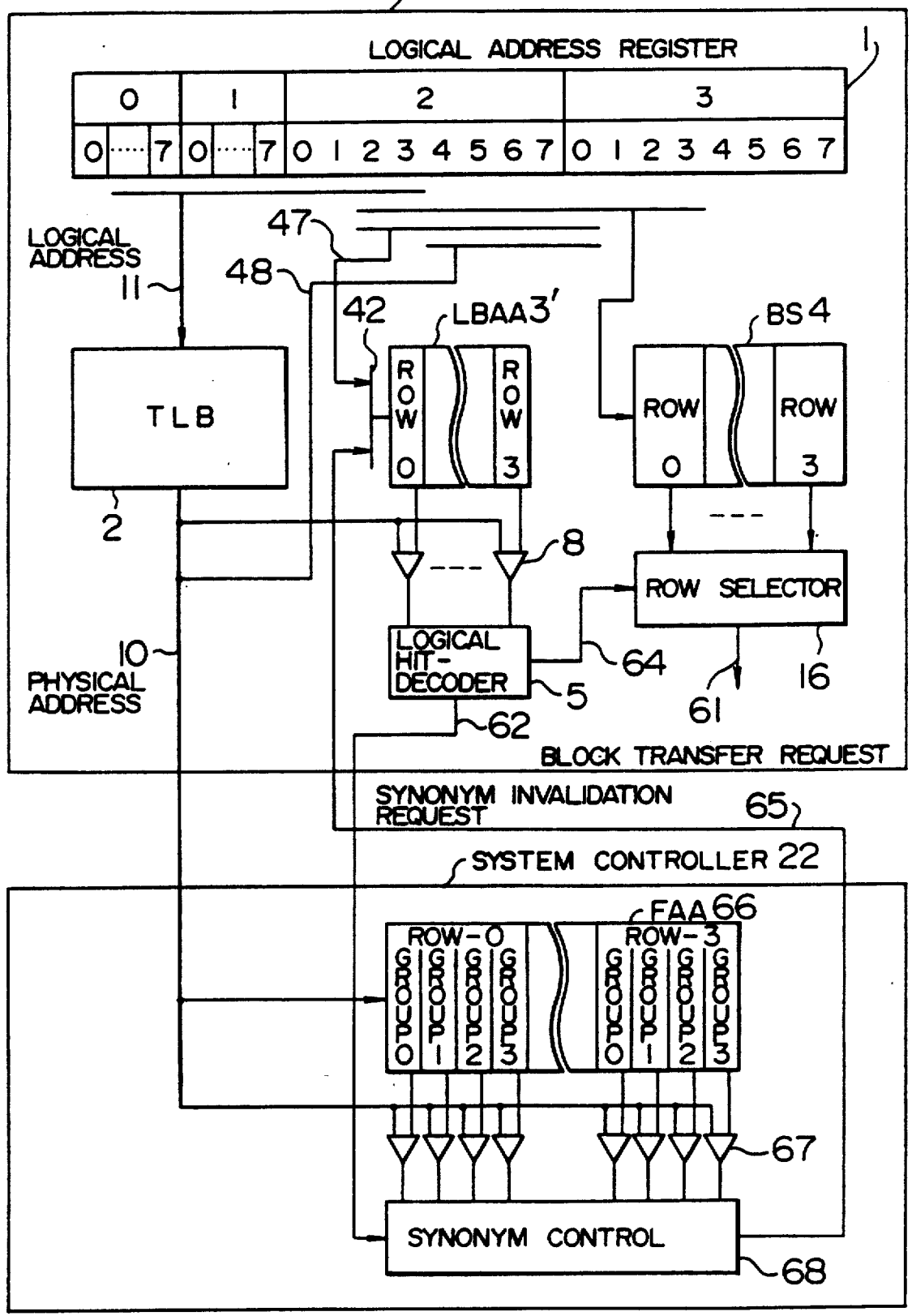
FIG. 7 is a block diagram illustrating a third embodiment of the buffer memory control apparatus according to the present invention.

FIG. 7 shows a third embodiment of the present invention. In this embodiment, a front address array (hereinafter abbreviated to "FAA") 66 is disposed in a system controller 22. The FAA 66 is a copy of a BAA provided for prevention of inconsistency of data between a plurality of buffers and memory locations in a structure of multiprocessor. That is, when writing is performed in one iP 23 (FIG. 2), the FAAs of all the iPs are identified, and if there is a block of a buffer holding the block in question, the block of the buffer is invalidated.

The function of the PBAA 44 of FIG. 4 is realized in the FAA 66. When buffer miss is detected in the buffer control unit 35 in the iP 23, a block transfer request 62 is generated. In the SC 22, preparation is made for block transfer, access is made to the FAA 66, and existence of synonym is examined through a synonym control circuit 68. Upon detection of existence of synonym, a synonym invalidation request is sent out to the iP 23. Upon reception of the synonym invalidation request, the iP 23 resets the valid bit to thereby invalidate the synonym.

I claim:

1. A buffer memory control apparatus for identifying a row of a buffer memory corresponding to a row of a memory in a digital computer system, said apparatus comprising:

a logical to physical address translating means for translating a logical address including a first logical address part to a physical address;

a first buffer address array accessed at least with the first logical address part and a second logical address part the second logical address part not being subject to address translation by the translating means;

a second buffer address array accessed with said second logical address part for selectively outputting a synonym, which synonym includes common ones of the logical addresses in the buffer memory corresponding to the physical address (10) of the memory in the computer system;

a synonym control means for the comparing of the synonym and the physical address and for providing a synonym hit identification to the first buffer address array in response to the synonym and the physical address matching;

the buffer memory storing data and being accessed with at least said first logical address part and said second logical address part;

a logical hit decoder means for comparing an output of the first buffer address array with the physical address and for enabling a portion of data to be read out of the buffer memory in response to finding a coincidence of the first buffer address array output and the physical address.

2. The buffer memory control apparatus according to claim 1 further comprising:

means connected to the synonym control means for invalidating blocks in said first and second buffer address arrays in which the synonym is included, on the basis of row and group numbers of the blocks, in response to the comparison by said synonym control means.

3. A buffer memory control apparatus comprising:

a first buffer address array arranged to be accessed with a first portion of a logical address and a synonym hit identification, the first buffer address array outputting a first physical address in response thereto, a second buffer address array arranged to be accessed with a TLB physical address translated from a second portion of the logical address, a buffer memory for storing data, a row selecting means for selecting and outputting data from a selected row of the buffer memory, a logical hit decoder means for comparing the first physical address with the TLB physical address and controlling the row selecting means in accordance therewith, and a synonym control means for comparing an output of the second buffer address array with the TLB physical address and selectively indicating a synonym hit in response to the comparison.

4. A buffer memory control apparatus comprising:

a logical address to physical address translating means for translating a logical address portion to a TLB physical address;

a first address array for parallel reading data that are equal in number to a number of rows therein, the first address array being accessed with an address including a first part of the logical address portion which first part is to be subject to the address translation and a second logical address part that is not subject to the translation, the first address array outputting a first physical address row in response to the first and second logical address parts;

a second address array for parallel reading data that are equal in number to a multiple of the number of rows, the second address array being accessed with the second logical address part, a hit row number, and a hit synonym number;

a comparing means for comparing a row of output data from the second address array with the TLB physical data;

a synonym control means for selectively generating the hit row number and the hit synonym number to at least the second address array in response to the comparing of the comparing means.

5. A buffer memory control apparatus for identifying a buffer corresponding to a memory in a digital computer system, said apparatus comprising:

a logical address to physical address translating means for translating a received portion of a logical address to a physical address;

a first address array accessed with a first part of the logical address portion, and a second part of the logical address which is not subject to the address translation;

a second address array accessed with at least a part of physical address and with said second part of the logical address;

a buffer for storing data, the buffer being accessed with at least said first part and said second part of the logical address;

a logical hit decoder means for comparing the physical address with an output of the first address array;

a selecting means controlled by the logical hit decoder means for selecting data from the buffer in response to the logical hit decoder means comparison; and, means for comparing an output of said second address array with the physical address to detect a hit of a synonym.

6. A buffer memory control apparatus for identifying a synonym hit in a set associative cache, the buffer memory control apparatus comprising:

a logical address to physical address translating means for reading a logical address portion and outputting a TLB physical address;

a first address array accessed with a first part of the logical address portion and with a second part of the logical address that is not subject to address translation for selectively outputting a first physical address in response to said first and second parts;

a logical hit decoder means for comparing the TLB and first physical addresses and for selectively outputting a confirmation signal indicating a coincidence between said TLB physical address and said first physical address;

a second address array accessed with said logical address second part for selectively outputting a synonym;

a comparing means for comparing the synonym with the TLB physical address;

a synonym control means for outputting a hit row number and a hit synonym in response to the comparison between said TLB physical address and said synonym;

a buffer selectively accessed by said the logical address first and second parts;

a selecting means for selecting a corresponding portion of data stored in the buffer, the selecting means being operatively connected with the logical hit decoder means to be enabled to output the selected corresponding data portion in response to the confirmation signal.

* * * * *